(12) United States Patent
Hougham et al.

(10) Patent No.: US 8,846,191 B2
(45) Date of Patent: *Sep. 30, 2014

(54) THERMAL EXPANSION CONTROL EMPLOYING PLATELET FILLERS

(71) Applicant: International Business Machines Corporation, Armonk, NY (US)

(72) Inventors: Gareth G. Hougham, Ossining, NY (US); Xiao H. Liu, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/649,760

(22) Filed: Oct. 11, 2012

(65) Prior Publication Data

US 2013/0035411 A1    Feb. 7, 2013

Related U.S. Application Data

(63) Continuation of application No. 13/083,803, filed on Apr. 11, 2011, now Pat. No. 8,449,971.

(51) Int. Cl.
*B32B 27/00* (2006.01)
*C08L 63/00* (2006.01)

(52) U.S. Cl.
CPC ..................................... *C08L 63/00* (2013.01)

USPC .................. 428/319.3; 428/304.4; 428/312.2; 428/312.8; 428/314.2; 428/316.6; 428/318.4; 524/559; 524/589; 524/612

(58) Field of Classification Search
USPC .......... 428/304.4, 312.2, 312.6, 312.8, 314.2, 428/316.6, 318.4, 319.3; 524/559, 589, 612
See application file for complete search history.

(56) References Cited

U.S. PATENT DOCUMENTS 7,417,315 B2    8/2008   Hougham et al.

FOREIGN PATENT DOCUMENTS

WO    2006011590 A1    2/2006

*Primary Examiner* — Robert Jones, Jr.
(74) *Attorney, Agent, or Firm* — Scully, Scott, Murphy & Presser, P.C.; Louis J. Percello, Esq.

(57) ABSTRACT

Bilayer platelet fillers are employed to compensate for a positive coefficient of thermal expansion (CTE) of an embedding polymeric material, or even to provide a composite structure having a negative CTE to eliminate or alleviate thermomechanical stress and/or delamination during thermal cycling. A bilayer platelet includes two joined layers having different CTEs. The CTE mismatch induces bending of the bilayer platelets, thereby causing cavities at temperatures lower than the joining temperature at which the bilayers are joined. The decrease in the volume of the polymeric material and the bilayer platelets at low temperatures is compensated by an accompanying increase in the volume of the cavities so that the composite structure has a temperature independent volume, a low net CTE, or even a negative CTE.

19 Claims, 11 Drawing Sheets

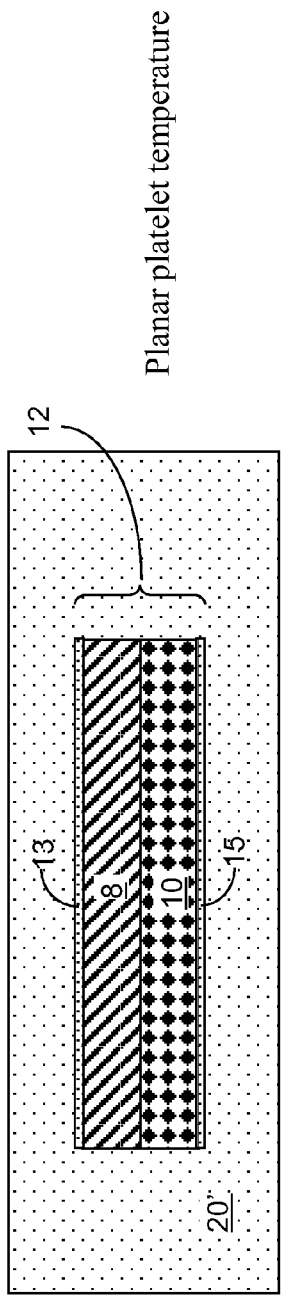
FIG. 2A  Planar platelet temperature
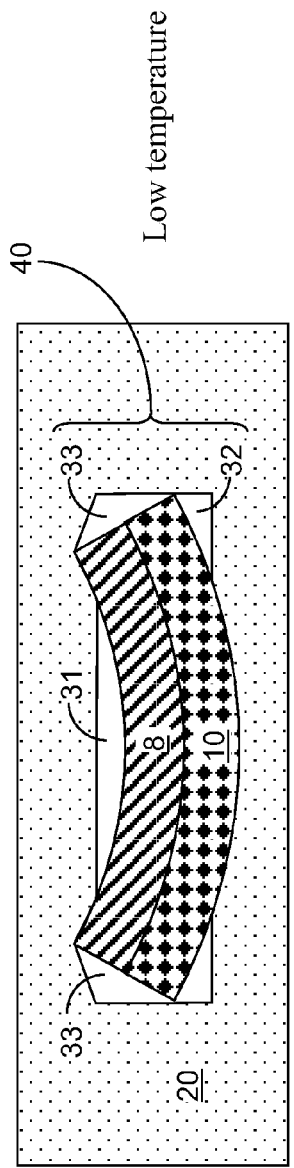
FIG. 2B  Low temperature
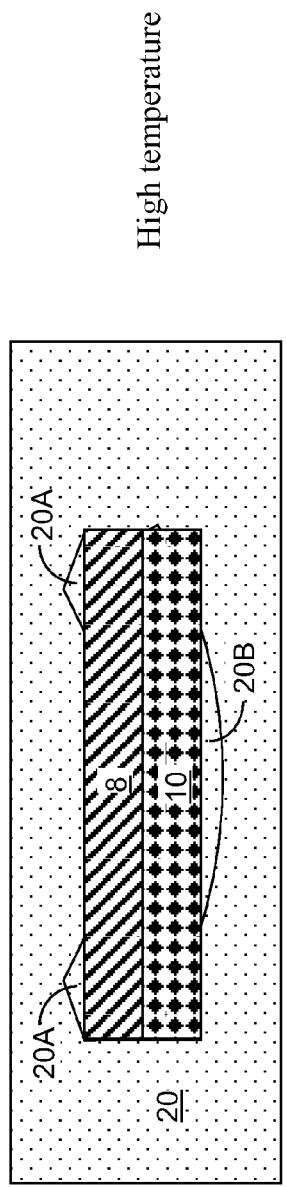
FIG. 2C  High temperature

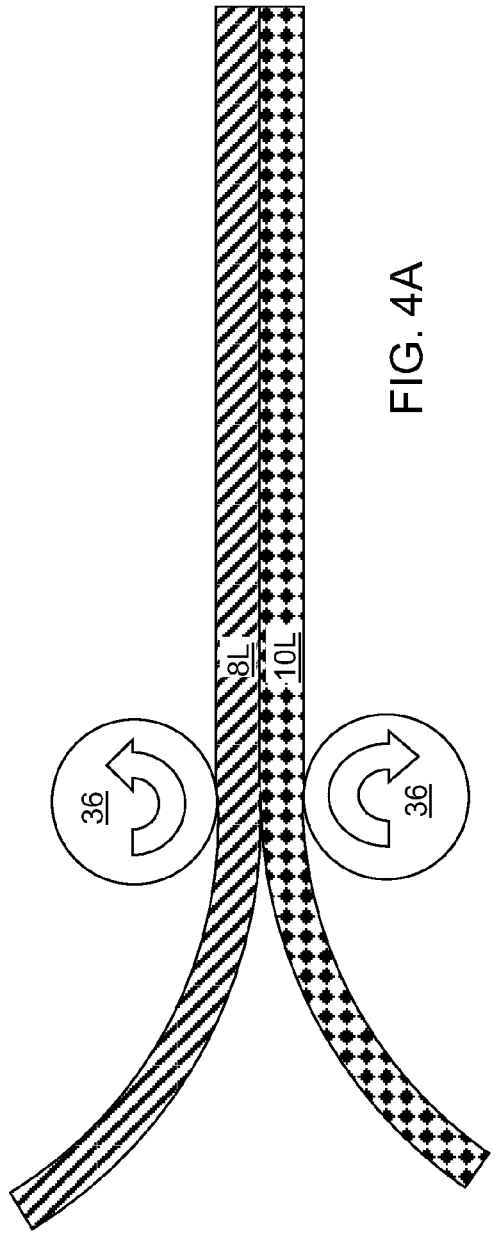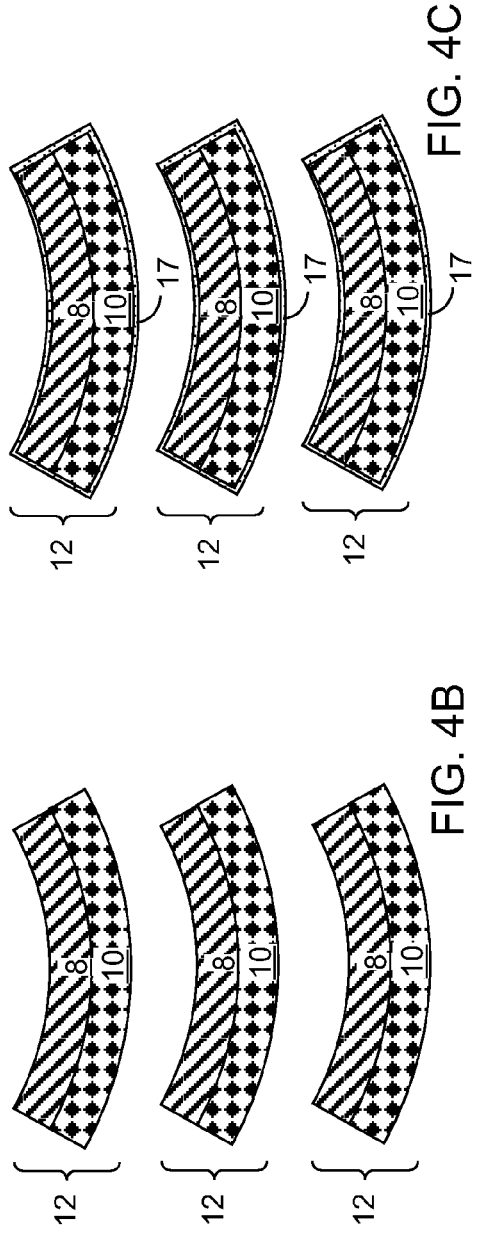

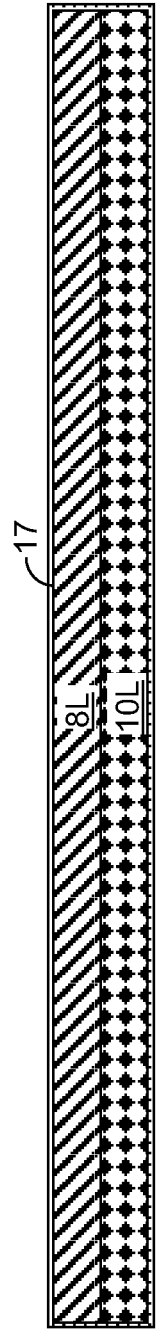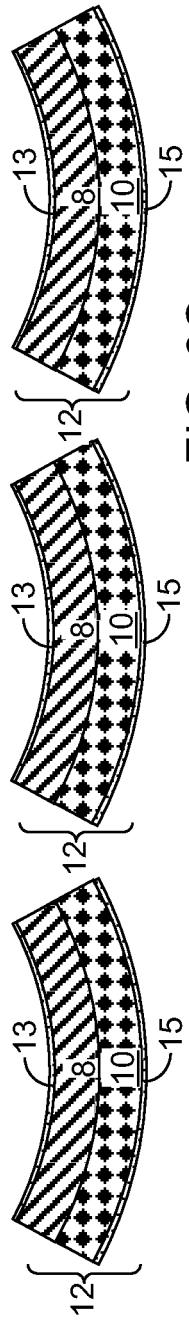

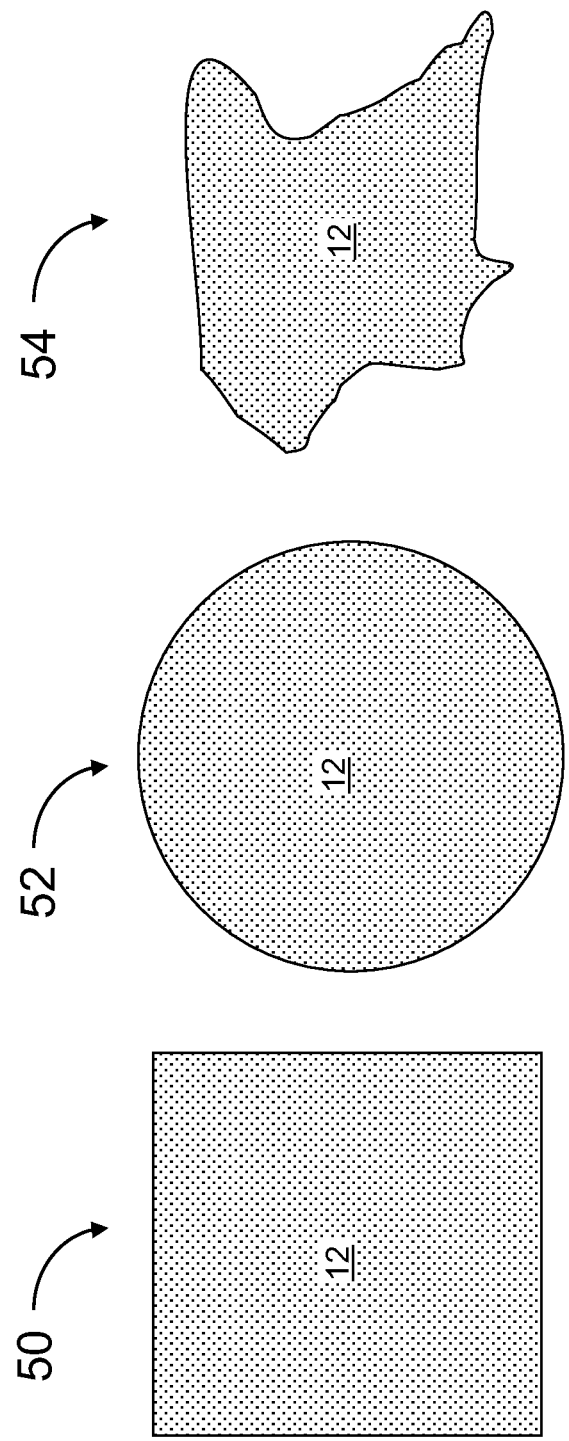

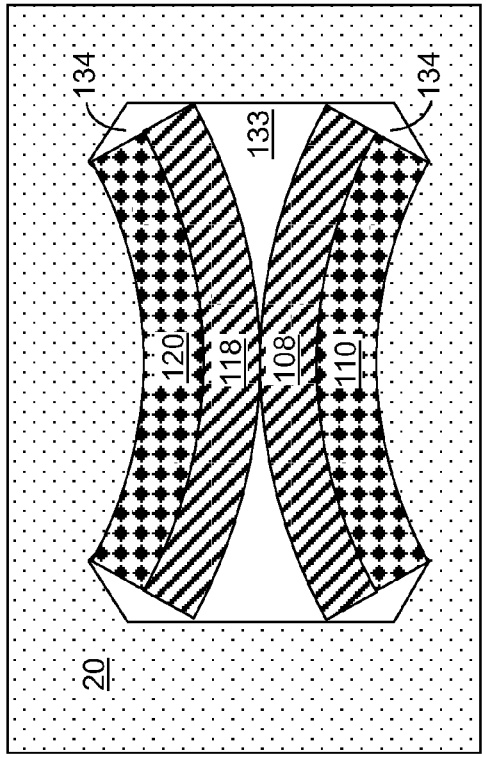
FIG. 8A — Planar platelet temperature
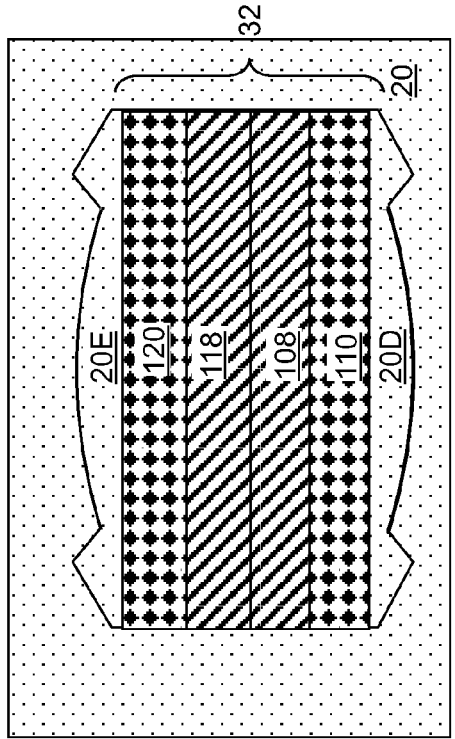
FIG. 8B — Burn-out high temperature
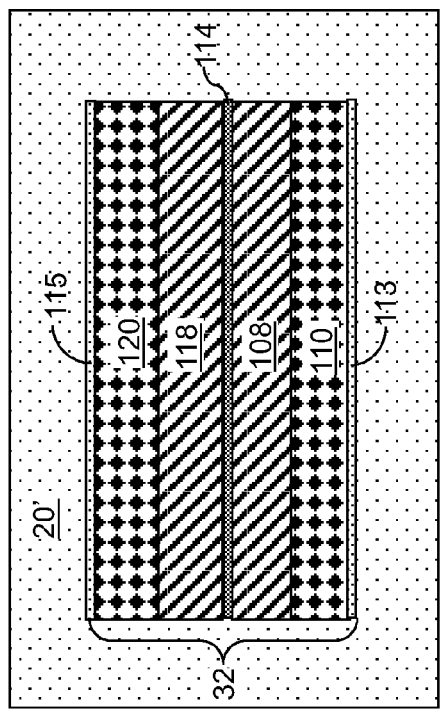
FIG. 8C — low temperature
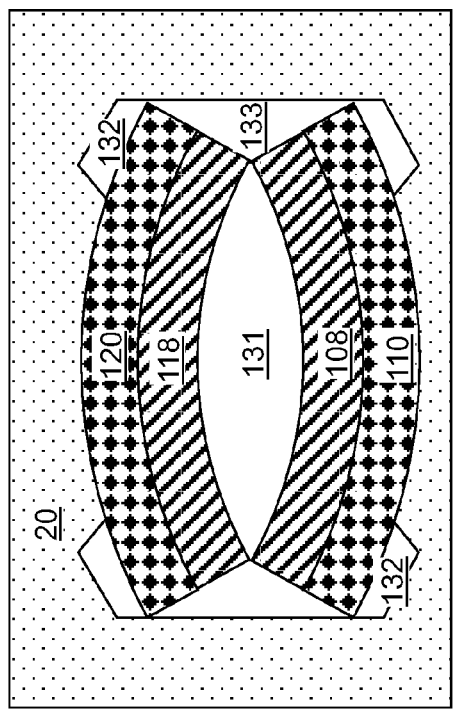
FIG. 8D — Planar platelet temperature

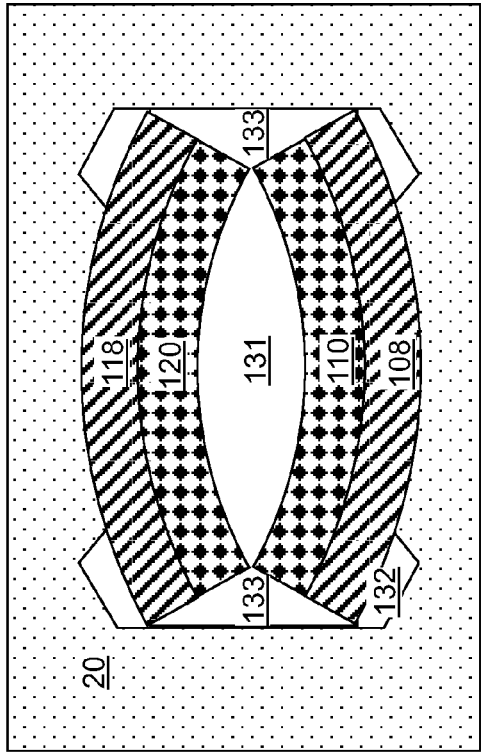
FIG. 9A  Planar platelet temperature
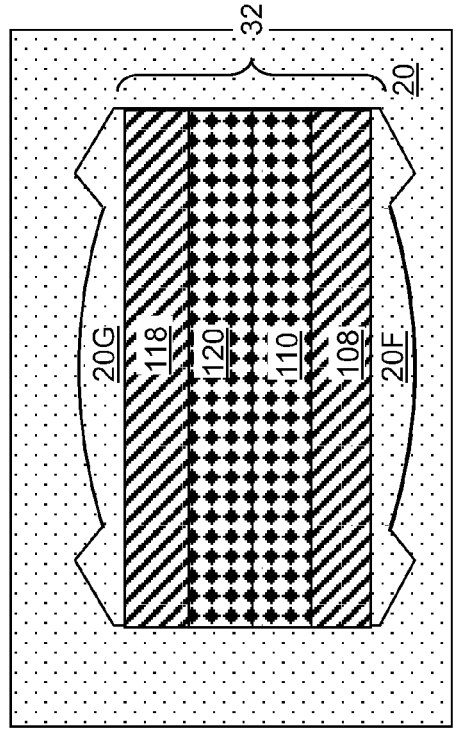
FIG. 9B  Burn-out high temperature
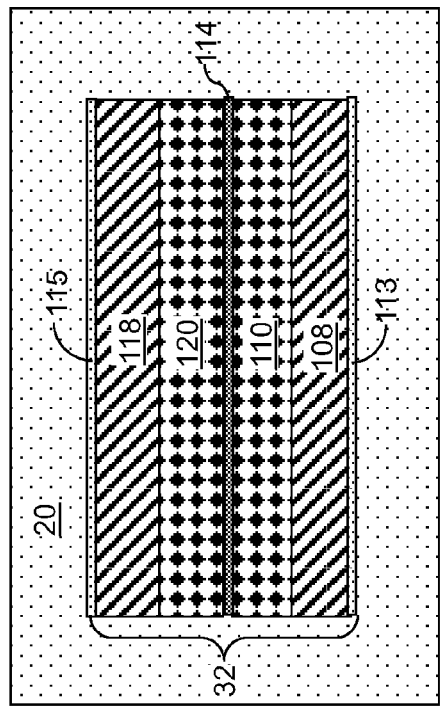
FIG. 9C  low temperature
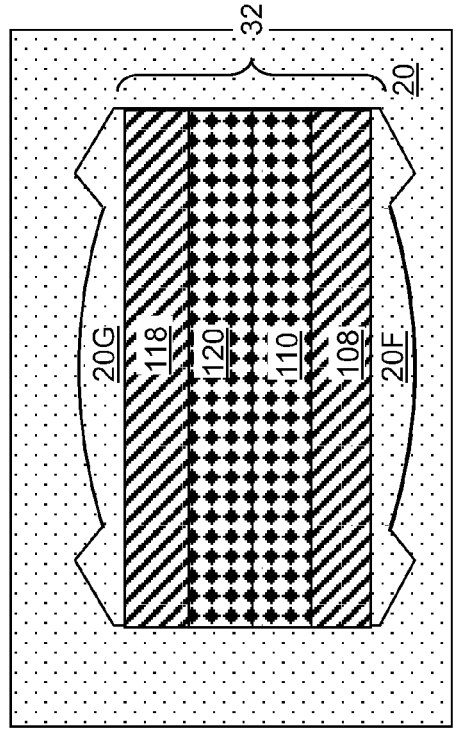
FIG. 9D  Planar platelet temperature

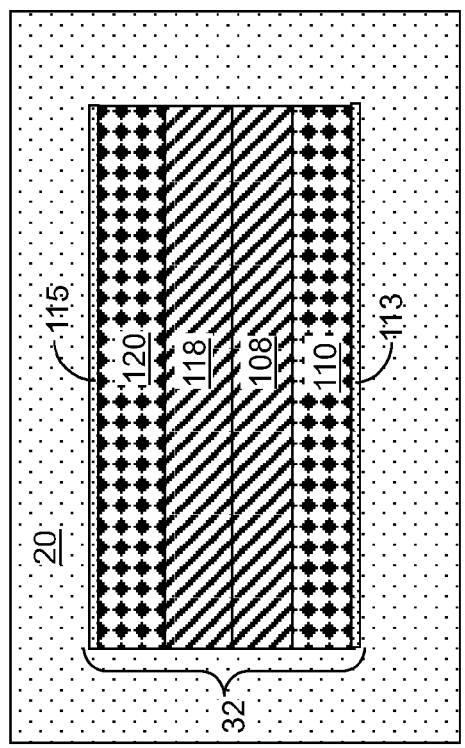
FIG. 10A Planar platelet temperature
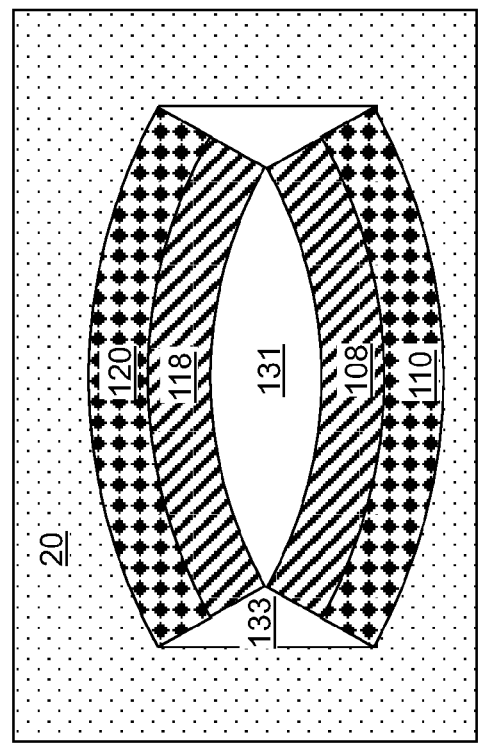
FIG. 10B low temperature
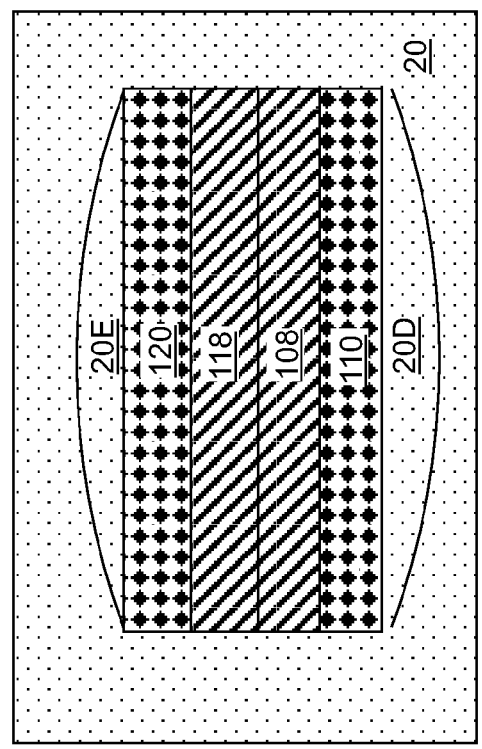
FIG. 10C Planar platelet temperature Planar platelet temperature Planar platelet temperature low temperature

THERMAL EXPANSION CONTROL EMPLOYING PLATELET FILLERS

CROSS REFERENCE TO RELATED APPLICATION

This application is a continuation of U.S. patent application Ser. No. 13/083,803, filed Apr. 11, 2011 the entire content and disclosure of which is incorporated herein by reference.

BACKGROUND

The present disclosure relates to methods for compensating for thermal expansion of a matrix by embedding bilayer filler platelets having different coefficients of thermal expansion (CTE) and structures for effecting the same.

Polymeric materials are widely used in many industrial applications for their advantageous properties. For example, in microelectronics industry, they are often used in electronic packaging for insulators. However, such polymeric materials have a high coefficient of thermal expansion (CTE) relative to other materials such as silicon for their applications. The mismatch of CTE between the materials can result in thermomechanical stress under temperature change, causing cracking and delamination during fabrication, testing, or service. A widely adopted method to lower the thermal expansion is to add a low CTE filler material within the polymeric material. However a fill fraction cannot be too high in many applications, thus severely limiting the capability of lowering the CTE of the polymeric materials.

SUMMARY

Bilayer platelet fillers are employed to compensate for a positive coefficient of thermal expansion (CTE) of an embedding polymeric material, or even to provide a composite structure having a negative CTE to eliminate or alleviate thermomechanical stress and/or delamination during thermal cycling. A bilayer platelet includes two joined layers having different CTEs. The CTE mismatch induces bending of the bilayer platelets, thereby causing cavities at temperatures lower than the joining temperature at which the bilayers are joined. The decrease in the volume of the polymeric material and the bilayer platelets at low temperatures is compensated by an accompanying increase in the volume of the cavities so that the composite structure has a temperature independent volume, a low net CTE, or even a negative CTE.

According to an aspect of the present disclosure, a composite structure includes a polymeric matrix and at least one bilayer platelet embedded therein, wherein each of the at least one bilayer platelet includes a pair of material layers joined to each other and having mismatched coefficients of thermal expansion (CTEs), wherein at least one cavity is present between each of the at least one bilayer platelet and the polymeric matrix in a temperature range within which surfaces of the at least one bilayer platelet have a non-zero curvature.

According to another aspect of the present disclosure, a method of forming a composite structure including a polymeric matrix and at least one bilayer platelet embedded therein is provided. The method includes: forming a filler powder including a plurality of bilayer platelets, each of the bilayer platelets including at least a pair of material layers joined to each other and having mismatched coefficients of thermal expansion (CTEs); mixing the filler powder with a polymer material to form a mixture; and curing the mixture at an elevated temperature, whereby a composite structure including a cured polymeric matrix and the plurality of bilayer platelets embedded therein.

BRIEF DESCRIPTION OF THE SEVERAL VIEWS OF THE DRAWINGS

FIG. 2A schematically illustrates a composite structure including a bilayer platelet embedded in a polymeric matrix and at a planar platelet temperature at the beginning of a curing step.

FIG. 2B schematically illustrates the composite structure of FIG. 2A after curing and after the temperature is lowered to a low temperature, which is the lower end of the operating temperature range of the composite structure.

FIG. 2C schematically illustrates the composite structure of FIG. 2B after the temperature is raised to a high temperature, which is the same as the planar platelet temperature.

FIGS. 4A-4C sequentially and schematically illustrate processing steps in a method of forming a plurality of bilayer platelets.

FIGS. 6A-6C sequentially and schematically illustrate processing steps in yet another method of forming a plurality of bilayer platelets.

FIGS. 7A-7C illustrate exemplary shapes for the bilayer platelets.

FIGS. 8A-8D sequentially and schematically illustrate a composite structure at various stages of processing steps according to a seventh exemplary embodiment of the present disclosure.

FIGS. 9A-9D sequentially and schematically illustrate a composite structure at various stages of processing steps according to an eighth exemplary embodiment of the present disclosure.

FIGS. 10A-10C sequentially and schematically illustrate a composite structure at various stages of processing steps according to a ninth exemplary embodiment of the present disclosure.

DETAILED DESCRIPTION

Figure 1A:
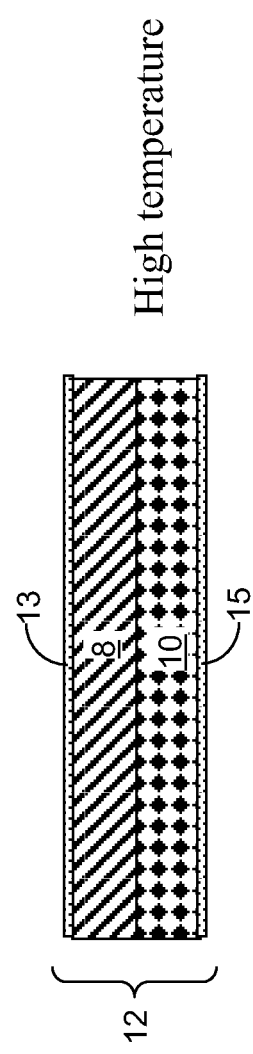
FIG. 1A illustrate a bilayer platelet of the present disclosure at a joining temperature, which is also referred to as a high temperature, a zero-stress temperature, and a planar platelet temperature.

As stated above, the present disclosure relates to methods for compensating for thermal expansion of a matrix by embedding bilayer platelet fillers having different coefficients of thermal expansion (CTE) and structures for effecting the same, which is now described in detail with accompanying figures. It is noted that like and corresponding elements are referred to by like reference numerals. The drawings are not in scale.

Figure 1B:
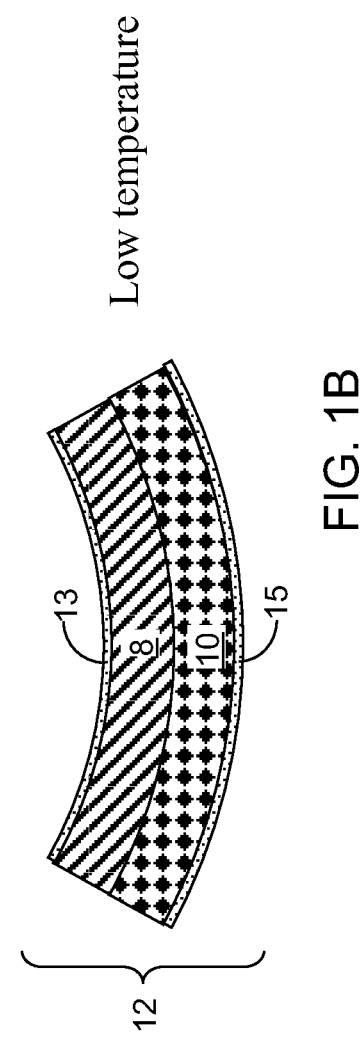
FIG. 1B illustrates the bilayer platelet of FIG. 1A at a low temperature, which is lower than the joining temperature.

Referring to FIGS. 1A and 1B, a bilayer platelet 12 of the present disclosure includes two layers of materials with different coefficients of thermal expansion. The bilayer platelets 12 are formed such that each layer has a different coefficient of thermal expansion. Thus, the constituent layers in the bilayer platelets 12 have different CTEs. The thickness of each bilayer platelet 12 is less than the mean width of the bilayer platelet 12. Formation of the bilayer platelets 12 can be accomplished by joining two constituent layers thereof at an elevated temperature such that the joined bilayer materials are stress free and flat at that elevated temperature at which the two materials are joined. This elevated temperature is herein referred to as the joining temperature, which is the upper end of the operating temperature range for the composite structure to be subsequently formed, and is also called the "high temperature" for this reason. The bilayer platelets 12 increase their geometric curvature as the bilayer platelets 12 are cooled from the joining temperature. Each bilayer platelet 12 includes a low CTE material layer and a high CTE material layer permanently joined to each other by a surface-to-surface contact and having substantially identical planar shapes at the high temperature, i.e., at an upper end of the operating temperature range.

Referring to FIG. 1A, a bilayer platelet 12 is flat at an joining temperature, i.e., at the temperature at which the two bilayers are adjoined to each other. The bilayer platelet 12 includes a high CTE material layer 8 and a low CTE material layer 10. The high CTE material layer 8 includes a material having a CTE that is greater than the CTE of the low CTE material layer 10, and the low CTE material layer 10 includes a material having a CTE that is less than the CTE of the high CTE material layer 8. As such, the CTE of each of the "high" and "low" CTE material layers (8, 10) are compared relative to the other layer of the two CTE material layers (8, 10). Thus, whenever two layers having different CTEs are joined to each other such that a contact is made two opposing planar surfaces, the layer having a greater CTE is the high CTE material layer 8, and the other layer is the low CTE material layer 10.

The joining temperature is labeled as "high temperature" in FIG. 1A. The joining temperature is at, near, or above the upper end of expected temperature range for the use of the bilayer platelet 12, i.e., the high end of the expected temperature range for the use.

The bilayer platelet 12 in FIG. 1A is shown in a stress free condition, which occurs at the temperature at which the high CTE material layer 8 and the low CTE material layer 10 are joined to each other. The bilayer platelet 12 in FIG. 1A is at the joining temperature at which the high CTE material layer 8 and the low CTE material layer 10 are joined. At the joining temperature, the bilayer platelet 12 is approximately flat, or planar in shape. The condition of the joining temperature is present when two CTE material layers (8, 10) are initially joined or when the bilayer platelet 12 is heat treated to anneal to a low stress condition.

The bilayer platelet 12 changes curvature as a function of temperature. As the temperature of the bilayer platelets 12 changes from the joining temperature, the bilayer platelet 12 bends toward the layer having a lesser lateral dimension. In other words, the bilayer platelet 12 has a non-zero curvature such that the exposed surface of one layer having lesser lateral dimensions is concave and the exposed surface of the other layer having greater lateral dimensions is convex.

If the temperature of the bilayer platelet 12 decreases below the joining temperature, the lateral dimensions of the outer surface of the layer having a greater CTE shrink more and thus, the layer having the greater CTE is the layer having lesser lateral dimensions, while the lateral dimensions of the outer surface of the layer having a lesser CTE shrink less and thus, the layer having the lesser CTE is the layer having greater lateral dimensions.

If the temperature of the bilayer platelet 12 increases above the joining temperature, the lateral dimensions of the outer surface of the layer having a greater CTE expand more and thus, the layer having the greater CTE is the layer having greater lateral dimensions, while the lateral dimensions of the outer surface of the layer having a lesser CTE expand less and thus, the layer having the lesser CTE is the layer having lesser lateral dimensions.

Referring to FIG. 1B, when the bilayer platelet 12 is brought to a lower temperature, the bilayer platelet 12 deforms because of CTE mismatch. The bilayer platelet 12 at the low temperature, i.e., after the cooling, is concave toward the high CTE material layer 8. If the temperature were to be subsequently increased, the bilayer platelet 12 would flatten out upon reaching the joining temperature. And if the temperature were to be increased above the joining temperature, the bilayer platelet 12 would deform in the opposite direction so that the bent bilayer platelet 12 would be concave toward the low CTE material layer 10.

The bilayer platelet 12 as originally formed can include anti-sticking material layers such as a first anti-sticking material layer 13 located on the outer surface of the high CTE material layer 8 and a second anti-sticking material layer 15 located on the outer surface of the low CTE material layer 10.

The "low temperature" depicted in FIG. 1B is the low end of the expected temperature range for the use of the bilayer platelet 12. Thus, the bilayer platelet 12 operates between the high temperature depicted in FIG. 1A and the low temperature depicted in FIG. 1B during most of the operational time period.

Referring to FIGS. 2A-2C, a bilayer platelet 12 placed in a polymeric matrix 20 is shown at different stages of processing. In general, a bilayer platelet 12 employed as fillers within a polymeric matrix 20 is herein referred to as a "bilayer platelet filler 12."

The bilayer platelet fillers 12 are stiffer than the polymeric matrix 20, i.e., the bilayer platelet fillers 12 have a higher elastic modulus than the polymeric matrix 20. Typically, the bilayers in the bilayer platelet 12 usually have lower CTE than a polymeric matrix in which the bilayer platelet 12 is embedded. In some cases, the CTE of at least one bilayer may have a higher CTE than the polymeric matrix. For optimal performance, the polymeric matrix 20 is typically soft and tough (non-brittle).

Referring to FIG. 2A, a bilayer platelet filler 12 is embedded in an uncured polymeric matrix 20' and then cured at a curing temperature. The curing temperature can be selected to be a temperature at which the bilayer platelet fillers 12 are planar. This temperature is called the "planar platelet temperature" or the zero-stress temperature, at which the bilayer platelet fillers 12 are physically flat and does not have internal stress. It is noted that platelets may not be absolutely flat and/or stress free in real systems. The illustrations in the various drawings are an idealization that provides a target for a fabrication process. Nonetheless, the system will function as described herein irrespective of deviations of the actual geometry of the platelets from the ideal geometry. The effectiveness of the platelets may diminish with increasing deviation of the actual geometry from the ideal geometry.

Materials for the polymeric matrix 20 include, but are not limited to, epoxides, cyanate esters, polyanhydrides, and polyamines. The embedding temperature can be the same as the joining temperature or close to the joining temperature, but is greater than the low end of the temperature range of the operation of the composite structure. After the bilayer platelet filler 12 is embedded, the composite structure is cured at a curing temperature, which can be the same as the joining temperature or greater than the joining temperature. After curing, the composite structure includes the bilayer platelet filler 12 and a cured polymeric matrix 20.

In order for the cavities to form, the bilayer platelet 12 needs to lose adhesion to the polymeric matrix 20. To facilitate the loss of adhesion, the surfaces of the bilayer platelets 12 are coated with an anti-sticking material layer, which can be implemented as the first anti-sticking material layer 13 and the second anti-sticking material layer 15. The surfaces of the bilayer platelet fillers 12 are treated to provide weak adhesion to the polymeric matrix 20. Adhesion is "weak" if the two materials contacting each other are free to dissociate from each other without external force.

In one embodiment, the material for the first and second anti-sticking material layers (13, 15) can be a low adhesion material like Teflon®, which could remain on the bilayer platelet fillers 12 throughout the life of a composite structure. Alternately, the material for the anti-sticking material layer 17 can be a sacrificial layer that either burns off or degrades into a gas and diffuse away during the curing of a polymeric matrix 20 that embeds the bilayer platelet fillers 12.

The weak adhesion can be present on a single side of the bilayer platelet fillers 12 that contact the polymeric matrix 20 and on which a cavity is to be subsequently formed, or can be present on both sides of the bilayer platelet fillers 12. As the bilayer platelet fillers 12 bend either more or less, the bilayer platelet fillers 12 delaminate from the polymeric matrix 20 to form reversible cavities.

For example, an ultrathin sacrificial layer having a thickness from 1 nm to 100 nm, and typically from 2 nm to 50 nm, is coated on all, or a substantial portion, of the surfaces of the bilayer platelet fillers 12. Alternately, filler materials having weak adhesion to the polymeric matrix 20 can be employed.

Typically, the volume of the first and second anti-sticking material layers (13, 15) is negligible compared to the volume of the two CTE material layers (8, 10), and the volume of the bilayer platelet filler 12 is essentially the same as the volume of the two CTE material layers (8, 10).

Referring to FIG. 2B, upon cooling of the composite structure below the joining temperature, the bilayer platelet filler 12 bends from the initial position to delaminate from the cured polymeric matrix 20 and to form cavities. The cooling can continue to a "low temperature," which is a temperature at the lower end of the temperature range in which the composite structure is used.

The cavities can include a concave side cavity 31, a convex side cavity 32, and a peripheral cavity 33. The concave side cavity 31 is formed as the center portion of the bilayer platelet filler 12 moves toward the side of the low CTE material layer 10 during the cooling. The concave side cavity 31 is topologically homeomorphic to a sphere, i.e., has a three-dimensional shape of genus 0. The genus of a connected, orientable surface is an integer representing the maximum number of cuttings along non-intersecting closed simple curves without rendering the resultant manifold disconnected. The genus of an object is equal to the number of topological handles on the object. The convex side cavity 32 is formed as the peripheral portion of the bilayer platelet filler 12 moves toward the side of the high CTE material layer 8 during the cooling. The convex side cavity 32 is topologically homeomorphic to a torus, i.e., has a three-dimensional shape of genus 1. The peripheral cavity 33 can be formed with the tilting and lateral movement of the sidewall surfaces of the bilayer platelet filler 12 during the cooling. The peripheral cavity 33 can be topologically homeomorphic to a torus. The concave side cavity 31 is located on a center portion of an outer surface of the high CTE material layer 8, and the convex side cavity 32 is located on a peripheral portion of the outer surface of the low CTE material layer 10. A center portion of an outer surface of the low CTE material layer 10 directly contacts the polymeric matrix 20.

As used herein, a "non-matrix element volume" refers to the volume of a set of elements of the composite structure within a void in the polymeric matrix 20. Thus, the non-matrix element volume 40 includes the bilayer platelet filler 12 and the various cavities (31, 32, 33). The volume fraction of the bilayer platelet filler 12 relative to the total volume of the composite structure (12, 20) can be selected so that the sum of the non-matrix element volume 40 and the volume of the cured polymeric matrix 20 at the low temperature is equal to the sum of the volume of the bilayer platelet fillers 12 and the cured polymeric matrix 20 at the planar platelet temperature after curing. Each non-matrix element volume 40 within the polymeric matrix 20 consists of a single bilayer platelet 12 and one or more cavities (31, 32, 33).

Referring to FIG. 2C, the various cavities (31, 32, 33) are temperature-reversible in the sense that the volume expansion of the cured polymeric material at least partially fills the cavities (31, 32, 33) at elevated temperatures above the low temperature. Thus, as the temperature of the composite structure (20, 12) is raised again toward the curing temperature, i.e., the planar platelet temperature, the various cavities (31, 32, 33) are gradually filled with expanding portions of the polymeric matrix 20, which increases in volume with increasing temperature. In other words, an increasing fraction of the various cavities (31, 32, 33) is partially filled within the polymeric matrix 20 with increasing temperature within the temperature range between the low temperature and the high temperature.

The expanding portions of the polymeric matrix 20 can include a concave side fill portion 20A and a convex side fill portion 20B. The concave side fill portion 20A and the convex side fill portion 20B are integral portions of, i.e., belong to, the polymeric matrix 20. The concave side fill portion 20A is present at a peripheral portion of the exposed surface of the high CTE material layer 8. The convex side fill portion 20B is present at a center portion of the exposed surface of the low CTE material layer 10. At an intermediate temperature between the low temperature illustrated in FIG. 2B and the high temperature illustrated in FIG. 2C, the concave side cavity 31, the convex side cavity 32, and the peripheral cavity 33 can be partially filled such that the total volume of the composite structure (20, 40) remains the same within the temperature range between the low temperature and the high temperature. Below the high temperature, the concave side cavity 31 is located on a center portion of an outer surface of the high CTE material layer 8, and the convex side cavity 32 is located on a peripheral portion of the outer surface of the low CTE material layer 10, and the center portion of an outer surface of the low CTE material layer 10 directly contacts the polymeric matrix 20.

Between the high temperature and the low temperature, the cavities (31, 32, 33) change in volume as the temperature of the composite structure changes. By selecting the materials for the polymeric matrix 20 and the components of the bilayer platelet filler 12 and the volume fraction of the bilayer platelet filler 12 relative to the total volume of the composite structure (including the bilayer platelet filler 12, the polymeric matrix, and the cavities (31, 32, 33)), the total volume of the composite structure can remain the same during repeated temperature cycling between the low temperature and the high temperature.

Figures 3A, 3B:
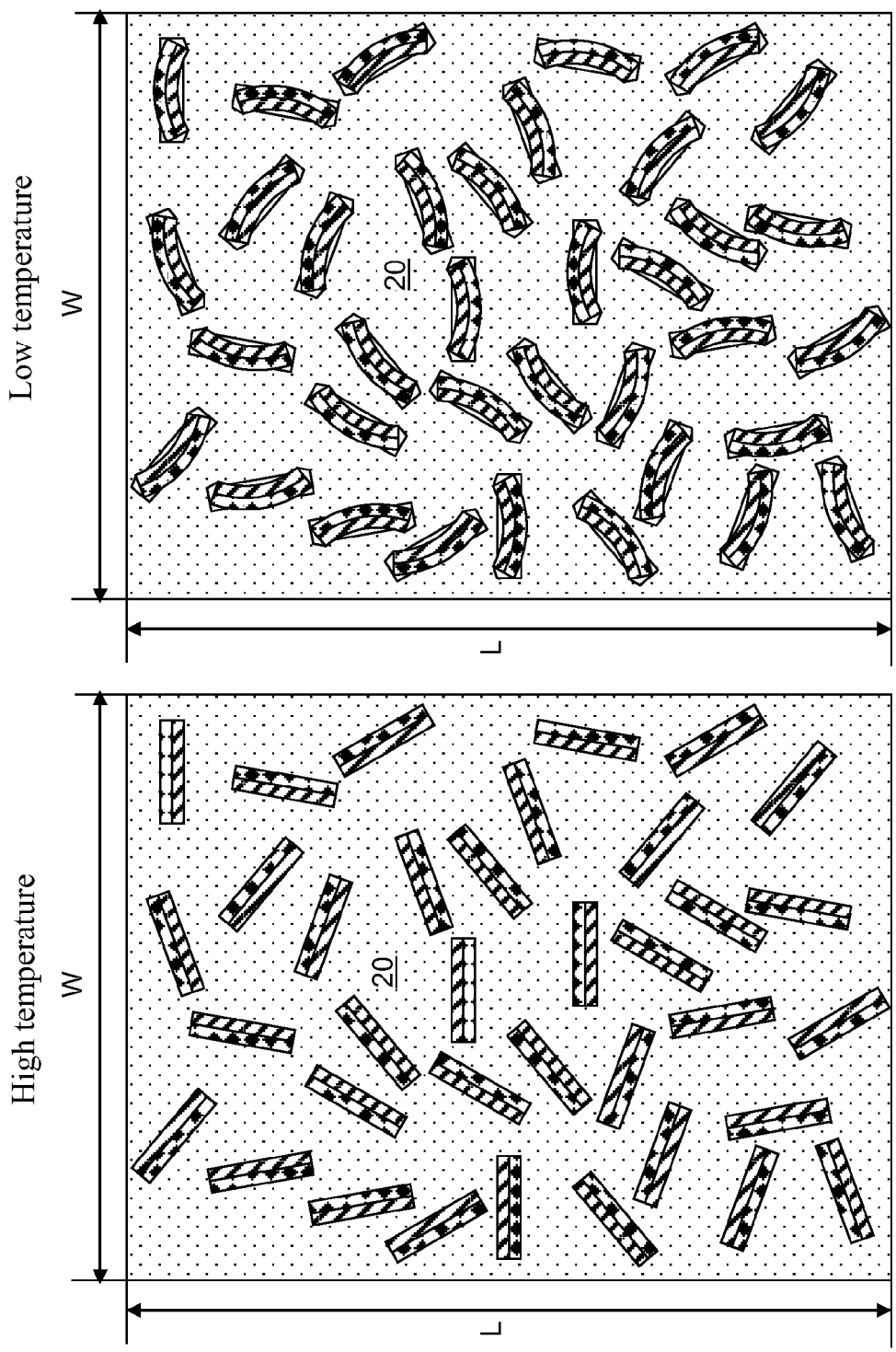
FIG. 3A schematically illustrates another composite structure including a plurality of bilayer platelets embedded in a cured polymeric matrix and at a high temperature.
FIG. 3B schematically illustrates the composite structure of FIG. 3A at a low temperature at which cavities are formed around each of the plurality of bilayer platelets.

Referring to FIGS. 3A and 3B, multiple bilayer platelets 12 can be mixed into an uncured polymeric matrix 20' which has a lower elastic modulus when fully cured than the bilayer platelets 12.

Each of the bilayer platelet fillers 12 includes two planar layers at a temperature at which the bilayer platelet fillers 12 are formed as a planar structure as described above. The bilayer platelet fillers 12 are formed at an elevated temperature that is at or near an upper end of a temperature range for use of the structure including the polymeric matrix 20 and the bilayer platelet fillers 12.

Once bilayer platelets 12 having a coating of the anti-sticking material layer are formed, the bilayer platelets 12 are mixed with an uncured polymeric matrix 20' to form a composite structure. In one embodiment, this composite structure is then cured to form a cured composite structure such as an electronic circuit board or another microelectronic article.

The mixture of the bilayer platelets 12, which are called bilayer platelet fillers 12 at this point, and the uncured polymeric matrix 20' is then cured at elevated temperature to form a solid structure including the bilayer platelet fillers 12 embedded in a cured polymeric matrix 20. The composite structure of the cured polymeric matrix 20 and the bilayer platelet fillers 12 embedded therein has the property of having a coefficient of thermal expansion that is less than an unfilled and cured polymeric matrix 20 polymer or a polymeric matrix 20 filled with equivalent amounts of the constituent materials of the platelet bilayers as separate layers, i.e., in individual non-joined forms without joining a matching pair of a first type platelet and a second type platelet.

The curing process, which is typically performed above or at the joining temperature, causes delamination of the bilayer platelet fillers 12 within the polymer matrix, thereby forming cavities due to the bending of the bilayer platelet fillers 12 as the temperature changes. As the temperature of the composite structure cools, the cured polymeric matrix 20 shrinks while the bilayer platelet fillers 12 bend. Cavities are formed around the bilayer platelet fillers 12. The dimensions of the cavities are on par with the dimensions of the bilayer platelet fillers 12. Each set of cavities around a bilayer platelet filler 12 can include a concave side cavity 31, a convex side cavity 32, and a peripheral cavity 33 as in FIG. 2B. Thus, if the size of the bilayer platelet fillers 12 is in the nanoscale range, the lateral dimensions of the cavities can also be in the nanometer scale.

The bilayer bends during cooling due to the thermo mechanical stress caused by the CTE mismatch between the two layers. As each bilayer platelet filler 12 bends within the polymer matrix, the bilayer platelet filler 12 creates localized small cavities in the polymeric matrix 20. Thus, while the polymeric matrix 20 intrinsically shrinks with cooling, it can be compensated by the addition of this cavity volume. Thus, the net CTE of the composite is reduced. The compensation of the volume reduction of the polymeric matrix 20 may be exactly compensated, undercompensated, or overcompensated by the formation of the cavities that accompanies the bending of the bilayer platelet fillers 12. By proper choice of materials for bilayer platelet fillers 12 and the volume fraction of the bilayer platelet fillers 12 within the polymeric matrix 20 at the time of embedding, and the total volume change of the structure including the polymeric matrix 20 and the bilayer platelet fillers 12 can be custom tailored so as to render the structure temperature independent or weakly temperature dependent with either a positive or negative net coefficient of thermal expansion.

In one embodiment, the increase in the cavity volume at a lower temperature can compensate for the accompanying loss of volume in the polymeric matrix 20. This can be quantitatively tuned by choices of materials for the bilayer platelet fillers 12 and the polymeric matrix 20, as well as the volume fraction of the bilayer platelet fillers 12 within the composite structure.

By employing the bilayer platelet fillers 12 as a filler material for a polymeric matrix 20, the volume change compensation according to the methods of the present disclosure enables effective temperature compensation without excessive use of filler materials. The reduction in the use of the filler material increases the volume fraction of the polymeric matrix 20 relative to the filler materials, and thus enhances the structural integrity of the composite structure.

For example, a composite structure may be tuned such that the total volume of the composite structure is temperature independent as the volume change of the non-matrix element 40 (see FIG. 2B) cancels the corresponding volume change in the polymeric matrix 20. In an illustrative example, the composite structure may have the width W, the length L, and the height H (not shown) at a high temperature at the upper end of an operating temperature range as illustrated in FIG. 3A, and have the width W, the length L, and the height H at the lower end of the operating temperature range as illustrated in FIG. 3B. The operating temperature rang can be, for example, from −100 degrees Celsius to 450 degrees Celsius or any subset thereof.

In another embodiment of the present disclosure, the volume fraction of the bilayer platelet fillers 12 can be increased so that the composite structure has a negative CTE (nCTE). The total volume of such an nCTE composite structure decreases with an increase in temperature.

In general, a composite structure including a polymeric matrix 20 and at least one bilayer platelet 12 embedded therein can be formed according to the method of the present disclosure. The method includes forming a filler powder including a plurality of bilayer platelets 12, mixing the filler powder with a polymer material to form a mixture, and curing the mixture at an elevated temperature. Each of the bilayer platelets 12 includes at least a pair of material layers joined to each other and having mismatched coefficients of thermal expansion (CTEs). The composite structure formed by curing the mixture includes a cured polymeric matrix 20 and the plurality of bilayer platelets 12 embedded therein. At least one cavity (e.g., 31, 32, 33 in FIG. 2B) is present between each of the at least one bilayer platelet 12 and the polymeric matrix 20 in a temperature range within which surfaces of the at least one bilayer platelet 12 have a non-zero curvature, which includes the temperature range between the low temperature and the high temperature described above.

In general, the net volume expansion of the composite structure is tunable over a wide range of temperature. The composite structure may have a net CTE that is smaller than the CTE of the polymeric matrix 20, zero net CTE, or even a net negative CTR. In other words, the composite structure can have a zero net coefficient of volume expansion within the temperature range between the low temperature and the high temperature, or can have a positive net coefficient of volume expansion (CTE) that is less than a CTE of the polymeric matrix 20 alone within the temperature range between the low temperature and the high temperature, or can have a negative net CTE within the temperature range between the low temperature and the high temperature.

Many different practical and cost effective methods of fabrication can be employed to manufacture the bilayer platelets 12. In general, a plurality of bilayer platelets is formed by forming a bilayer sheet by joining two material layers having mismatched CTEs and singulating the bilayer sheet to form the plurality of bilayer platelets 12. FIGS. 4A-4C schematically illustrate a first method of forming bilayer platelets 12.

Referring to FIG. 4A, a high CTE material layer 8L and a low CTE material layer 10L having different CTEs are brought together between pressure rollers 36, at a joining temperature. The joining temperature is chosen for a given pair of materials based on the softening or curing temperatures of the materials and the desired upper use temperature of the final composite structure, which correspond to the "high temperature" in FIGS. 2C and 3A. The selection of the upper end of the usable temperature range, i.e., the high temperature, as the joining temperature is because the joining temperature at which the bilayer platelets 12 is flat, and because the bilayer platelets 12 have the effect of providing a negative CTE contributor only below the joining temperature. A bilayer sheet (8L, 10L) is formed by joining the two CTE material layers (8L, 10L). The bilayer sheet (8L, 10L) can be formed at elevated temperature, which can be, for example, between 100 degrees Celsius and 450 degrees Celsius.

Materials for each CTE material layer (8L or 10L) in the bilayer sheet (8L, 10L) can include polymers, ceramics, glasses, and metallic materials. The polymers include, but are not limited to, polyimide, epoxides, cyanate esters, polyvinyls, polyacrylates, bismaleimides. Ceramics include, but are not limited to, aluminum oxide. Glasses include, but are not limited to, borosilicate glass, borophosphosilicate glass, and fluorosilicate glass. Metallic materials include, but are not limited to, aluminum, copper, nickel, titanium, iron, molybdenum, gold, other metals, and alloys or combinations of thereof.

Referring to FIG. 4B, the bilayer sheet (8L, 10L) is singulated into bilayer platelets 12. In general, the bilayer sheet (8L, 10L) can be converted into bilayer platelets 12 by dividing the bilayer sheet into many small pieces. Methods for converting a bilayer sheet to bilayer platelets 12 include grinding, pulverizing, laser cutting of the bilayer sheet employing a projection laser, grit blasting to produce particles of desired sizes, and photolithographic etching into specific shapes.

The bilayer platelets 12 are effective in a wide range of dimensions. For example, the thickness of a bilayer platelet 12 can be from 50 nm to 10 cm, and typically from 500 nm to 1 mm, and more typically from 1 micron to 200 microns, although lesser and greater thicknesses can also be employed. For use of bilayer platelets 12 in microelectronic applications, lateral dimensions of the bilayer platelets 12 can be less than 20 microns. In one embodiment, the bilayer platelets 12 can be small enough to be considered to be in powder form, i.e., the lateral dimensions of each bilayer platelet 12 is in the micron range, i.e., from 0.1 micron to 10 microns.

Referring to FIG. 4C, the bilayer platelet 12 can be processed to additionally have all or a significant portion of its outer surfaces coated with a thin layer of an anti-sticking material to form an anti-sticking material layer 17. Methods that can be employed to form the anti-sticking material layer 17 to reduce adhesive property of the surface of the bilayer platelets 12 include, but are not limited to, spray coating or other types of coating of the singulated bilayer platelets 12 around entire surface thereof. Materials for the anti-sticking material layer 17 include, but are not limited to, polymethyl methacrylate (PMMA), alpha methyl styrene, 2,5-Diphenyloxazole (PPO), norbornene, polytetrafluoroethylene such as Teflon®, fluoropolymers, and combinations thereof.

In one embodiment, the material for the anti-sticking material layer 17 can be a low adhesion material like Teflon®, which could remain on the bilayer platelet fillers 12 throughout the life of a composite structure. Alternately, the material for the anti-sticking material layer 17 can be a sacrificial layer that either burns off or degrades into a gas and diffuse away during the curing of a polymeric matrix 20 that embeds the bilayer platelet fillers 12.

The bilayer platelets 12 may include an additional adhesive layer (not shown) between the high CTE material layer 8 and the low CTE material layer 10 to improve the adhesion therebetween. Such an additional adhesive layer may be provided between the high CTE material layer 8 and the low CTE material layer 10 at the time of formation of the bilayer sheet (8L, 10L), i.e., at a processing step corresponding to FIG. 4A. Adhesives or adhesive layers that could be used, by example, include epoxides, acrylics, cyanoacrylates, cyanate esters, and other organic adhesives. Also thin metal layers such as chromium or titanium are known for good adhesion. The adhesive or adhesive layer is thin compared to the thicknesses of the CTE material layer (8L or 10L).

Figure 5A:
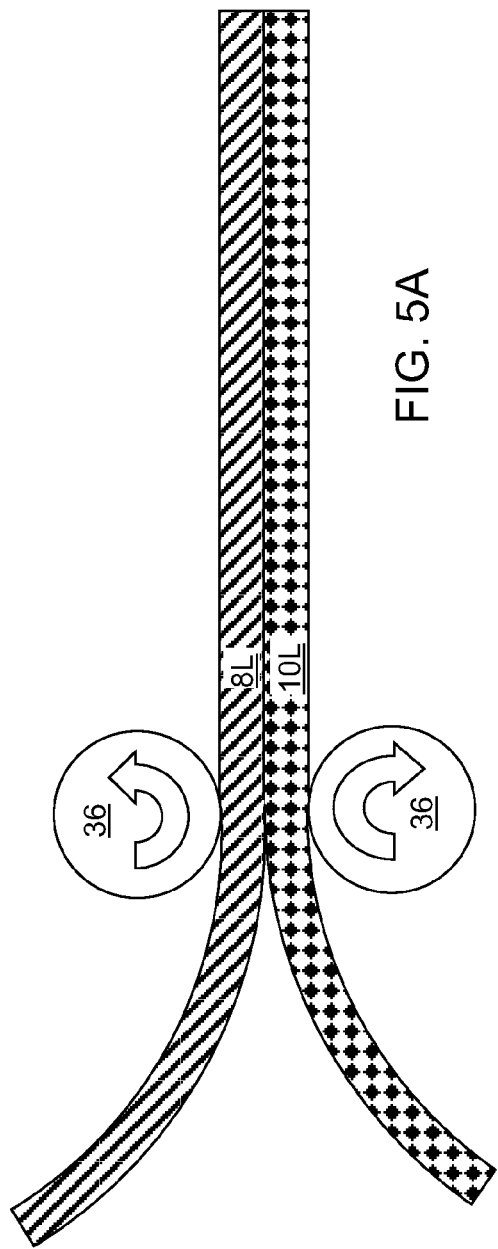
FIGS. 5A-5C sequentially and schematically illustrate processing steps in another method of forming a plurality of bilayer platelets.
Figure 5B:
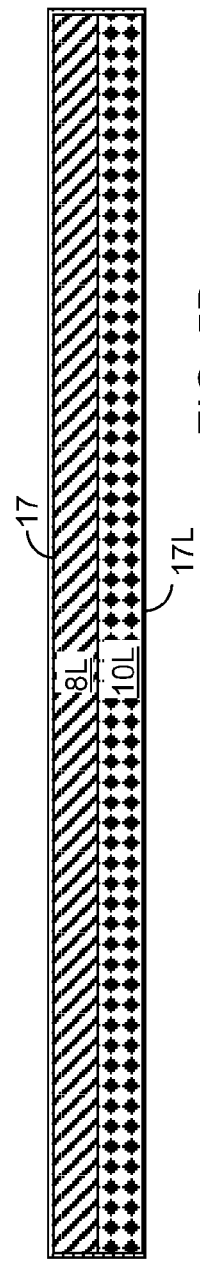
Figure 5C:
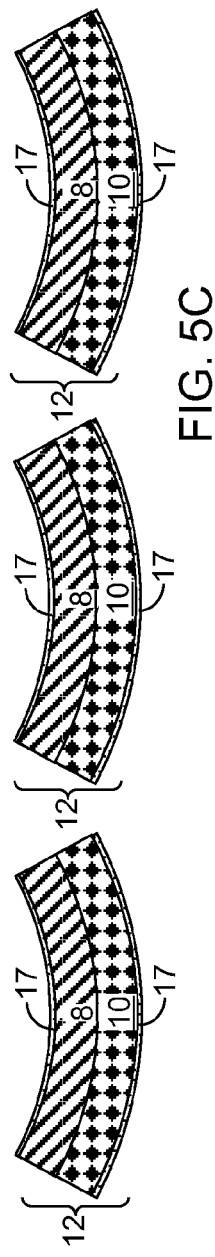

FIGS. 5A-5C schematically illustrate a second method of forming bilayer platelets 12. The step of FIG. 5A can be the same as the step of FIG. 4A. Referring to FIG. 5B, the bilayer sheet (8L, 10L) is coated with an anti-sticking material layer 17 prior to singulation of the bilayer sheet (8L, 10L) into bilayer platelets 12. Referring to FIG. 5C, a coated bilayer sheet (8L, 10L, 17) is singulated employing the same methods as in FIG. 4B.

In the second method, the top surface and the bottom surface of the bilayer sheet (8L, 10L) are coated with an anti-sticking material layer 17 prior to singulation into the bilayer platelets 12. In other words, the coating of the bilayer sheet (8L, 10L) is performed before singulation. This has the effect of limiting the presence of the anti-sticking material layer 17 to the top and bottom surfaces of the bilayer platelets 12.

FIGS. 6A-6C schematically illustrate a third method of forming bilayer platelets 12. The bilayer sheet (8L, 10L) as illustrated in FIG. 6A is formed by any other means than roll lamination illustrated in FIGS. 4A and 5A. Such other methods for forming a bilayer sheet (8L, 10L) includes, but are not limited to, spraying, spin coating, vapor phase deposition such as sputtering, chemical vapor deposition, spraying, precipitation, evaporation, molecular beam deposition, and combinations thereof. The bilayer sheet (8L, 10L) can be formed at elevated temperature, which can be, for example, between 100 degrees Celsius and 450 degrees Celsius. Referring to FIGS. 6B and 6C, the same processing steps as in FIGS. 4B and 4C or FIGS. 5B and 5C can be employed in the third method. The anti-sticking material layer 17, upon singulation, becomes a first anti-sticking material layer 13 located on the outer surface of the high CTE material layer 8 and a second anti-sticking material layer 15 located on the outer surface of the low CTE material layer 10.

Referring to FIGS. 7A-7C, exemplary shapes for the bilayer platelets 12 are illustrated. The exemplary shapes include a square 50, a circle 52, and a random shape 54. Different shapes may have different mechanical efficiencies. Different shapes may have different cost basis because of different methods for production. For instance, regular well defined shapes like a square or a circle would need to be made by processes such as photolithography or projection laser cutting. Random shapes could be made by less expensive techniques such as grinding, crushing, pulverizing, ultrasonic fracture, cryogenic fracture, and so forth.

In a first exemplary embodiment, two polymers with different CTE values are brought together in a roll to roll process and joined under pressure and at an elevated temperature. A first polyimide with a chemical structure of pyromellitic dianhydride (PMDA) and oxydianiline (ODA) is pretreated with sodium hydroxide, followed by a treatment with acetic acid to neutralize. The first polyimide has a thin layer of polyamic acid, and constitutes the high CTE material layer 8L. A second polyimide with a chemical structure 3,3',4,4'-biphenyltetracarboxylic dianhydride (BPDA) and p-phenylenediamine (PDA) is also pretreated to form a thin film of polyamic acid. The second polyimide constitutes the low CTE material layer 10L. These two CTE mismatched material layers (8L, 10L) are brought together under pressure and at an elevated temperature and form a bilayer sheet (8L, 10L) having a strong bond to each other.

This bilayer sheet (8L, 10L) can then be coated with an anti-sticking material layer 17, which can be a thin layer of a sacrificial polymer, such as polymethylmethacrylate (PMMA). The bilayer sheet (8L, 10L) is then ground by mechanical means to a fine powder below 20 micron in any dimension. The bilayer platelets 12 are provided in the form of the fine powder.

The bilayer platelets 12 in the form of the fine powder are then mixed with a matrix polymer such as FR4 epoxy resin, which is a flame resistant binder that can be woven into fiberglass cloth. This fine powder is herein referred to as a "filler powder." The mixture of the resin and the filler powder is then formed into a desired part, for example, by molding. The desired part can be, for example, a circuit board. This mixture is cured at a temperature typical for curing the polymer material, which is about 180 degrees Celsius for FR4 epoxy resin. After curing, the part, i.e., a composite structure of the cured polymer and the filler powder, is brought to a temperature high enough to depolymerize and drive off the PMMA without decomposing the polymeric matrix, which is about 200 degrees Celsius for FR4 epoxy resin. Upon cooling, the composite structure can have a net CTE of zero in the temperature range between room temperature and 180 degrees Celsius.

In a second exemplary embodiment, a permanent anti-sticking material layer 17 can be substituted for the sacrificial layer. For example, a bilayer sheet (8L, 10L) can be coated with a thin layer of a Teflon® or Teflon-like material having a thickness less than or about one micron. Preferably, the thickness of the thin layer of a Teflon® or Teflon-like material can be about 100 nm.

The coated bilayer sheet (8L, 10L, 17) is subsequently ground into power form to be used as a filler powder. The filler powder is mixed with an epoxy resin and then formed into a target shape, such as the shape of a circuit board. Curing can be performed at a typical cure temperature of around 180 degrees Celsius, followed by cooling to complete the manufacture of the composite structure.

In a third exemplary embodiment, two different ceramic green sheet layers are brought together, laminated and then sintered into final ceramic form. Upon cooling, the ceramic bilayer sheet (8L, 10L) is pulverized into powder form so that each particle of bilayer platelets 12 has lateral dimensions less than 20 microns across. The powder of bilayer platelets 12 can be coated with a thin anti-sticking material layer 17 such as a Teflon® layer. This filler power is then mixed with an epoxy resin, and is formed into a desirable shape and cured at a curing temperature of about 180 degrees Celsius. Upon cooling, the manufacture of the composite structure is complete.

In a fourth exemplary embodiment, a first soluble or liquid-suspended precursor layer including a low CTE material is applied to an anti-sticking material layer. For example, the low CTE material can be quartz, and the anti-sticking material layer can be a flat substrate such as a Teflon® layer. The liquid is evaporated so that the inorganic layer is converted to a solid layer, which is employed as a low CTE material layer 10L. For example, the low CTE material layer 10L can be a colloidal silica layer. A second soluble or liquid-suspended precursor layer including a high CTE material is prepared. The second soluble or liquid-suspended precursor layer is applied on top of the first material and the liquid evaporated. For example, the high CTE material can be alumina as a fine dispersion. The two precursor bilayers are then brought to a higher temperature to fully cure or sinter into a bilayer sheet (8L, 10L). This bilayer sheet (8L, 10L) is pulverized into a powder with bilayer platelets 12, which are shaped so that the thickness is less than the lateral dimensions. The powder of the bilayer platelets 12 can be subsequently coated with a thin anti-sticking material layer 17. The resulting filler powder is mixed with a thermosetting resin, for instance FR4 epoxy resin. This mix is formed into the shape of a desired composite structure such as a circuit board, and is subsequently cured. Upon cooling, the manufacture of the composite structure is complete.

In a fifth exemplary embodiment, a modification can be made to the thermal treatment of any of the aforementioned embodiments. The composite structure including the polymer matrix and the filler powder of the bilayer platelets 12 is cured at a higher temperature than the zero-stress temperature (i.e., the joining temperature) of the filler powder of the bilayer platelets 12. All bilayer platelets 12 are flat at the zero-stress temperature.

During the curing at a temperature above the zero stress temperature, the bilayer platelet 12 has the opposite type of curvature of the normal type of curvature that the bilayer platelet 12 has within the operating temperature range, i.e., between a low temperature and a high temperature that is the same as the zero-stress temperature. During the cure process, the polymers in the polymeric matrix 20 become crosslinked. Upon cooling of the composite structure, the bilayer platelets 12 reverse their curvature and thereby break away, i.e., become detached, from the polymeric matrix 20. Thus, the bilayer platelets 12 become liberated from the polymeric matrix 20 so that the bilayer platelets 12 can move freely within the polymeric matrix 20.

In an illustrative example, a bilayer sheet (8L, 10L) can include a high CTE material layer 8L having polyimide polymer such as 2,2-bis(3,4-dicarboxyphenyl)hexafluoropropane dianhydride (6FDA-ODA) and a low CTE material layer 10L having polyimide such as pyromellitic dianhydride phenylene diamine polyimide (PMDA-PDA). The two mismatched CTE material layers (8L, 10L) are joined together at 150 degrees Celsius by lamination to form the bilayer sheet (8L, 10L). The bilayer sheet (8L, 10L) is powderized by various methods and mixed with an uncured polymer material. When mixed at room temperature, each filler powder of a bilayer platelet filler 12 has a positive curvature individually, i.e., is concave toward the high CTE material layer 8 within each bilayer platelet filler 12. The temperature of this composite mixture is then raised through the zero-stress temperature of 150 degrees Celsius where all bilayer platelets fillers 12 are momentarily flat. When the temperature is raised above 150 degrees Celsius, the bilayer platelet fillers 12 reverse curvature to have the high CTE material layer 8 on the outside of a convex surface. The composite structure is brought to a temperature of about 200 degrees Celsius to cure. After the polymer is crosslinked at the cure temperature, the composite structure is cooled. The bilayer platelet fillers 12 again reverse curvature as the temperature is decreased below the zero-stress temperature during cooling, and are detached from the polymeric matrix as a result. The detachment of the bilayer platelet fillers 12 is beneficial to the performance of the bilayer platelet fillers 12.

In the sixth exemplary embodiment, each of the bilayer platelet fillers 12 includes a high CTE material layer 8 and a low CTE material layer 10 that have anisotropic CTEs. Specifically, the in-plane CTE is higher than the out-of-plane CTE in the high CTE material layer. This combination of CTE properties is advantageous because the size of the various cavities (31, 32, 33; See FIG. 2B) can be maximized while the change in the volume of the bilayer platelet fillers 12, i.e., an intrinsic CTE-driven volume change of the bilayer platelet fillers 12, is minimized. An example of such materials is lead metaniobate, which has an in-plane CTE greater than the out of plane CTE.

In some embodiments, the filler powder can include quadruple platelet structures. Each of the quadruple platelet structures includes a pair of bilayer platelets that are joined to each other by a decomposable adhesive layer. FIGS. 8A-8D schematically illustrates a seventh exemplary embodiment of the present disclosure. A greater effect of void formation may be obtained by laminating two sets of bilayer sheets together in a symmetrically opposing fashion with a decomposable adhesive layer therebetween. This quadruple layer structure can include, from bottom to top, a first low CTE material layer, a first high CTE material layer joined to the first low CTE material layer, the decomposable adhesive layer, a second high CTE material layer, and a second low CTE material layer joined to the second high CTE material layer. The quadruple layer structure is then converted into a powder form by any of the methods previously described for forming bilayer platelets 12, which include, for example, pulverizing and lithographically cutting. Each particle in the powder form includes a pair of bilayer platelets and a decomposable adhesive layer therebetween.

Referring to FIG. 8A, each pair of bilayer platelets and the decomposable adhesive layer 114 collectively constitute a quadruple platelet structure 32. The pair of bilayer platelets includes a first bilayer platelet and a second bilayer platelet. The first bilayer platelet includes a first low CTE material layer 110 and a first high CTE material layer 108 that are permanently joined together. The second bilayer platelet includes a second low CTE material layer 120 and a second high CTE material layer 118 that are permanently joined together. Each of the first bilayer platelet (108, 110) and the second bilayer platelet (118, 120) can be formed employing any of the methods described above for forming a bilayer platelet 12. Optionally, a first anti-sticking material layer 113 and a second anti-sticking material layer 115 can be provided on the outer surfaces of the quadruple platelet structure 32 including the surface of the first low CTE material layer 110 and the second low CTE material layer 120.

Once reduced in size to particles having less than 20 microns in lateral dimensions, the filler powder of quadruple platelet structures 32 is mixed with a matrix polymer such as FR4 resin and cured to crosslink the resin. The embedding of a single quadruple platelet structure 32 within an uncured polymer matrix 20' is schematically illustrated in FIG. 8A. In practice, many quadruple platelet structures 32 in the powder form are embedded in an uncured polymeric matrix 20'. The filler powder of quadruple platelet structures 32 and the uncured polymeric matrix 20' can be partly cured at a planar platelet temperature, which is also the zero-stress temperature and the joining temperature for the component bilayer platelets.

Referring to FIG. 8B, after the polymeric matrix 20 (e.g., the resin) is at least partly crosslinked so that the polymeric matrix is solidified and the quadruple platelet structures 32 are no longer able to move significant distances from their locations within the polymeric matrix 20, the temperature of the composite structure is raised to a burn-out high temperature to decompose the decomposable adhesive layer 114. Thus, the pair of two symmetrically opposed bilayer platelets is separated. The two bilayer platelets include a first bilayer platelet (108, 110) and a second bilayer platelet (118, 120). A peripheral cavity 133 is formed between the two bilayer platelets. Further, additional peripheral cavities 134 are formed around each of the two bilayer platelets due to the movements of the edges of the bilayer platelets.

Referring to FIG. 8C, the bilayer platelets curve independently of each other as the temperature is changed from above their zero-stress temperature to below the zero-stress temperature. While moving essentially independently, the two bilayer platelets contact each other so that a greater cavity volume is provided between and around the two bilayer platelets as the temperature is reduced to a low temperature, which is the lower end of the operating temperature range of the composite structure. Compared to the cavities in the structure of FIG. 2B, a greater cavity is formed on the side of the high CTE material layers (108, 118), i.e., where a concave side cavity 131 is formed. Further, convex side cavities 132 and a peripheral cavity 133 are also formed in a manner similar to the structure of FIG. 2B. Each of the convex side cavities 132 can be homeomorphic to a torus.

Referring to FIG. 8D, the various cavities (131, 132, 133) are temperature-reversible in the sense that the volume expansion of the cured polymeric material at least partially fills the cavities (131, 132, 133) at elevated temperatures above the low temperature. Thus, as the temperature of the composite structure (20, 32, 131, 132, 133) is raised again toward the planar platelet temperature, i.e., the zero-stress temperature, the various cavities (131, 132, 133) are gradually filled with expanding portions of the polymeric matrix 20, which increases in volume with increasing temperature. In other words, an increasing fraction of the various cavities (131, 132, 133) is partially filled within the polymeric matrix 20 with increasing temperature within the temperature range between the low temperature and the high temperature.

The expanding portions of the polymeric matrix 20 can include a first convex side fill portion 20D and a second convex side fill portion 20E. The first and second convex side fill portions (20D, 20E) are integral portions of the polymeric matrix 20. Additional fill portions (not shown) are present within the peripheral cavity 133 at intermediate temperatures between the low temperature and the planar platelet temperature, which is the high temperature, i.e., the uppermost temperature, in the temperature range for used of the composite structure (20, 32, 131, 132, 133). However, the concave side cavity 131 is always bounded by the inner surfaces of the first and second high CTE material layers (108, 118), and the polymeric matrix 20 does not expand into the concave side cavity 131. Below the high temperature, the concave side cavity 131 is located on the outer surface of the first high CTE material layer 108 and the outer surface of the second high CTE material layer 118, and the convex side cavities 132 are located on a peripheral portion of the outer surface of each of the first and second low CTE material layers (110, 120), and the center portions of the outer surfaces of the low CTE material layers (110, 120) directly contact the polymeric matrix 20.

Each non-matrix element volume within the polymeric matrix 20 includes a quadruple platelet structure 32, which is a pair of bilayer platelets, and one or more cavities. The pair of bilayer platelets includes a first bilayer platelet and a second bilayer platelet, and peripheral portions of a first high CTE layer 108 within the first bilayer platelet contacts peripheral portions of a second high CTE layer 118 within the second bilayer platelet, and the concave side cavity 131 is present between the first high CTE layer 108 and the second high CTE layer 118.

Between the high temperature (the planar platelet temperature) and the low temperature, the cavities (131, 132, 133) change in volume as the temperature of the composite structure changes. By selecting the materials for the polymeric matrix 20 and the components of the quadruple platelet structures 32 and the volume fraction of the quadruple platelet structures 32 relative to the total volume of the composite structure (including the quadruple platelet structures 32, the polymeric matrix, and the cavities (131, 132, 133)), the total volume of the composite structure can remain the same during repeated temperature cycling between the low temperature and the high temperature. Further, the net CTE of the composite structure can be set at a small positive number, zero, or a negative number. In other words, the composite structure can have a zero net coefficient of volume expansion within the temperature range between the low temperature and the high temperature, or can have a positive net coefficient of volume expansion (CTE) that is less than a CTE of the polymeric matrix 20 alone within the temperature range between the low temperature and the high temperature, or can have a negative net CTE within the temperature range between the low temperature and the high temperature.

FIGS. 9A-9D schematically illustrates an eighth exemplary embodiment of the present disclosure. A greater effect of void formation may be obtained by laminating two sets of bilayer sheets together in a symmetrically opposing fashion with a decomposable adhesive layer therebetween as in the seventh embodiment. In the eighth embodiment, however, a first low CTE material layer 108 is bonded to a second low CTE material layer 118 through the decomposable adhesive layer 114. Thus, the quadruple layer structure according to the eighth embodiment of the present disclosure can include, from bottom to top, a first high CTE material layer, a first low CTE material layer joined to the first high CTE material layer, the decomposable adhesive layer 114, a second low CTE material layer, and a second high CTE material layer joined to the second low CTE material layer. The quadruple layer structure is then converted into a powder form by any of the methods previously described for forming bilayer platelets 12, which include, for example, pulverizing and lithographically cutting. Each particle in the powder form includes a pair of bilayer platelets and a decomposable adhesive layer therebetween.

The processing steps of FIGS. 8B, 8C, and 8D are performed at steps of FIGS. 9B, 9C, and 9D. A concave side cavity 131 and a peripheral cavity 133 are formed at the processing step of FIG. 9B, and two concave side cavities 135 can be formed at the processing step of FIG. 9C. Each of the two convex side cavities 135 in FIG. 9C can be homeomorphic to a sphere.

Referring to FIG. 9D, the various cavities (133, 134, 135) are temperature-reversible in the sense that the volume expansion of the cured polymeric material at least partially fills the cavities (133, 134, 135) at elevated temperatures above the low temperature. The concave side cavity 131 present at the step of FIG. 9B is transient, i.e., disappears below the planar platelet temperature. Thus, the concave side cavity 131 is not present between the low temperature and the planar platelet temperature. As the temperature of the composite structure (20, 32, 133, 134, 135) is raised again from the low temperature toward the planar platelet temperature, i.e., the zero-stress temperature, the various cavities (133, 134, 135) are gradually filled with expanding portions of the polymeric matrix 20, which increases in volume with increasing temperature. In other words, an increasing fraction of the various cavities (133, 134, 135) is partially filled within the polymeric matrix 20 with increasing temperature within the temperature range between the low temperature and the high temperature.

The expanding portions of the polymeric matrix 20 can include a first concave side fill portion 20F and a second concave side fill portion 20G. The first and second concave side fill portions (20F, 20G) are integral portions of the polymeric matrix 20. Additional fill portions (not shown) are present within the peripheral cavity 133 and the additional peripheral cavity at intermediate temperatures between the low temperature and the planar platelet temperature, which is the high temperature, i.e., the uppermost temperature, in the temperature range for used of the composite structure (20, 32, 133, 134, 135). Below the high temperature, the concave side cavities 135 are located on the outer surface of the first high CTE material layer 108 and the outer surface of the second high CTE material layer 118, and the peripheral cavity 133 are located between the peripheral portions of the outer surface of each of the first and second low CTE material layers (110, 120).

Each non-matrix element volume within the polymeric matrix 20 includes a quadruple platelet structure 32, which is a pair of bilayer platelets, and one or more cavities. The pair of bilayer platelets includes a first bilayer platelet and a second bilayer platelet, and a center portion of a first low CTE layer 110 within the first bilayer platelet contacts a center portion of a second low CTE layer 120 within the second bilayer platelet, and a peripheral cavity 133 is present between the first low CTE layer 110 and the second low CTE layer 120.

Between the high temperature (the planar platelet temperature) and the low temperature, the cavities (133,134,135) change in volume as the temperature of the composite structure changes. By selecting the materials for the polymeric matrix 20 and the components of the quadruple platelet structures 32 and the volume fraction of the quadruple platelet structures 32 relative to the total volume of the composite structure (including the quadruple platelet structures 32, the polymeric matrix, and the cavities (133, 134, 135)), the total volume of the composite structure can remain the same during repeated temperature cycling between the low temperature and the high temperature. Further, the net CTE of the composite structure can be set at a small positive number, zero, or a negative number. In other words, the composite structure can have a zero net coefficient of volume expansion within the temperature range between the low temperature and the high temperature, or can have a positive net coefficient of volume expansion (CTE) that is less than a CTE of the polymeric matrix 20 alone within the temperature range between the low temperature and the high temperature, or can have a negative net CTE within the temperature range between the low temperature and the high temperature.

FIGS. 10A-10C schematically illustrates a ninth exemplary embodiment of the present disclosure, which is derived from the seventh exemplary embodiment by omitting the use of the decomposable adhesive layer 114 and omitting the step of the burn-out of the decomposable adhesive layer 114 at a processing step corresponding to FIG. 8B. Thus, the processing steps of FIGS. 10A, 10B, and 10C can be identical to the processing steps of FIGS. 8A, 8C, and 8D, respectively. The shapes of cavities are altered relative to the seventh embodiment, but the mechanism of providing a small positive number, zero, or a negative number for the net CTE of the composite structure is the same as in the seventh exemplary embodiment.

Figure 11A:
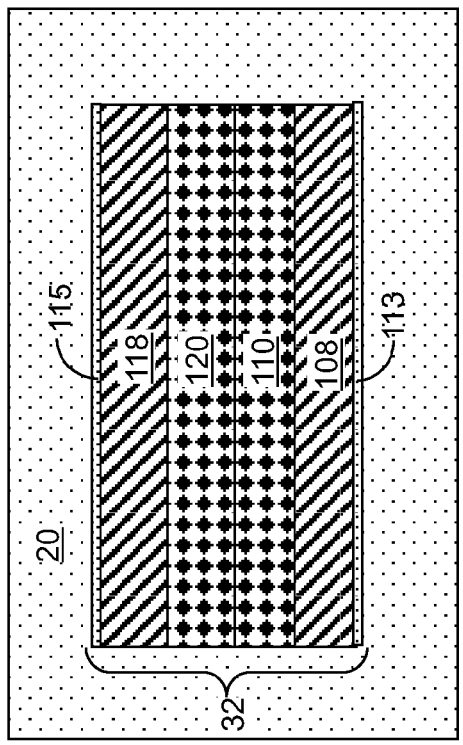
FIGS. 11A-11C sequentially and schematically illustrate a composite structure at various stages of processing steps according to a tenth exemplary embodiment of the present disclosure.
Figure 11C:
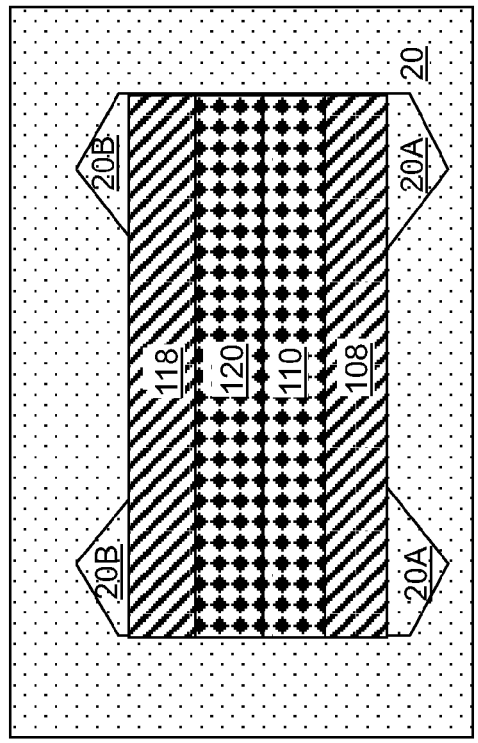
Figure 11B:
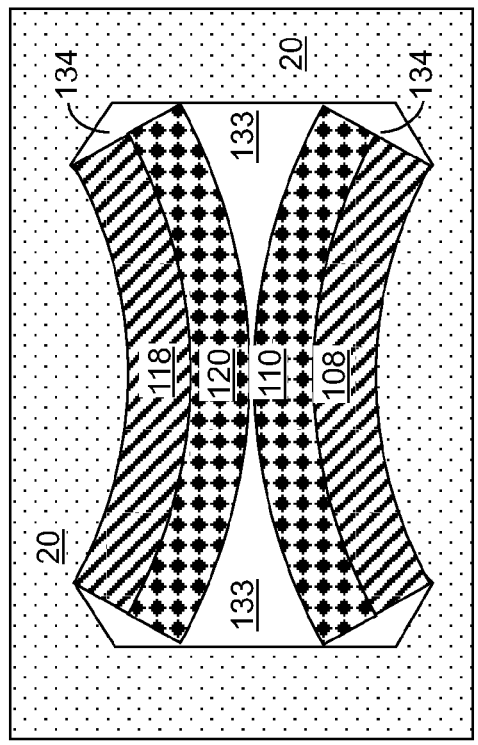

FIGS. 11A-11C schematically illustrates a tenth exemplary embodiment of the present disclosure, which is derived from the eighth exemplary embodiment by omitting the use of the decomposable adhesive layer 114 and omitting the step of the burn-out of the decomposable adhesive layer 114 at a processing step corresponding to FIG. 9B. Thus, the processing steps of FIGS. 11A, 11B, and 11C can be identical to the processing steps of FIGS. 9A, 9C, and 9D, respectively. The shapes of cavities are altered relative to the eighth embodiment, but the mechanism of providing a small positive number, zero, or a negative number for the net CTE of the composite structure is the same as in the eighth exemplary embodiment.

The quadruple platelet structure 32 of FIGS. 8A-8D, 9A-9D, 10A-10C, and 11A-11C may include two identical bilayer platelets, or may include different bilayer platelets having different material compositions. Further, the bilayer platelets may have different anti-sticking material layers and/or adhesive layers. If the two bilayer platelets are different, an adhesive layer between the two bilayer platelets may be applied between the two bilayer platelets, and the adhesive layer can delaminate from one bilayer platelet at high temperature, but adheres to the other bilayer platelet due to the different adhesive strengths to different materials.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

What is claimed is:

1. A composite structure comprising a polymeric matrix and a bilayer platelet embedded therein, wherein said bilayer platelet comprises a pair of material layers joined to each other and having mismatched coefficients of thermal expansion (CTEs), wherein at least one cavity is present between said bilayer platelet and a surface of said polymeric matrix in a temperature range within which surfaces of said bilayer platelet have a non-zero curvature, wherein boundary surfaces of one of said at least one cavity consist of at least one surface of said polymeric matrix and at least one surface of said bilayer platelet, wherein a plurality of cavities is present between said bilayer platelet and surfaces of said polymeric matrix in said temperature range.

2. The structure of claim 1, wherein said composite structure has a zero net coefficient of volume expansion within said temperature range.

3. The structure of claim 1, wherein said composite structure has a positive net coefficient of volume expansion (CTE) that is less than a CTE of said polymeric matrix alone within said temperature range.

4. The structure of claim 1, wherein said composite structure has a negative net CTE within said temperature range.

5. The structure of claim 1, wherein an increasing portion of said at least one cavity is partially filled within said polymeric matrix with increasing temperature within said temperature range.

6. The structure of claim 1, wherein said bilayer platelet comprises a low CTE material layer and a high CTE material layer permanently joined to each other by a surface-to-surface contact and having identical planar shapes at an upper end of said temperature range.

7. The structure of claim 6, wherein one of said at least one cavity is located on a center portion of an outer surface of said high CTE material layer, and another of said at least one cavity is located on a peripheral portion of the outer surface of said low CTE material layer.

8. The structure of claim 7, wherein a center portion of an outer surface of said low CTE material layer directly contacts said polymeric matrix.

9. The structure of claim 1, wherein each non-matrix element volume within said polymeric matrix consists of a single bilayer platelet and one or more cavities.

10. The structure of claim 1, wherein each non-matrix element volume within said polymeric matrix comprises a pair of bilayer platelets and one or more cavities.

11. A composite structure comprising a polymeric matrix and at least one bilayer platelet embedded therein, wherein each of said at least one bilayer platelet comprises a pair of material layers joined to each other and having mismatched coefficients of thermal expansion (CTEs), wherein at least one cavity is present between said at least one bilayer platelet and a surface of said polymeric matrix in a temperature range within which surfaces of said at least one bilayer platelet have a non-zero curvature, wherein boundary surfaces of one of said at least one cavity consist of at least one surface of said polymeric matrix and at least one surface of said bilayer platelet, wherein said at least one bilayer platelet includes a first bilayer platelet and a second bilayer platelet, and peripheral portions of a first high CTE layer within said first bilayer platelet contacts peripheral portions of a second high CTE layer within said second bilayer platelet, and a cavity is present between said first high CTE layer and said second high CTE layer.

12. The structure of claim 11, wherein said pair of bilayer platelets includes a first bilayer platelet and a second bilayer platelet, and a center portion of a first low CTE layer within said first bilayer platelet contacts a center portion of a second low CTE layer within said second bilayer platelet, and a cavity is present between said first low CTE layer and said second low CTE layer.

13. The structure of claim 1, wherein each layer in one of said plurality of bilayer platelets comprises a material selected from polymers, ceramics, glasses, and metallic materials.

14. The structure of claim 1, wherein said polymeric matrix comprises a material selected from epoxides, cyanate esters, polyanhydrides, and polyamines.

15. The structure of claim 1, wherein said boundary surfaces of said one of said at least one cavity consists of said at least one surface of said polymeric matrix and at least one surface of a single material layer within said bilayer platelet.

16. A composite structure comprising a polymeric matrix and a bilayer platelet embedded therein, wherein said bilayer platelet comprises a pair of material layers joined to each other and having mismatched coefficients of thermal expansion (CTEs), wherein at least one cavity is present between said bilayer platelet and a surface of said polymeric matrix in a temperature range within which surfaces of said bilayer platelet have a non-zero curvature, wherein boundary surfaces of one of said at least one cavity consist of at least one surface of said polymeric matrix and at least one surface of said bilayer platelet, wherein a surface of said one of said at least one cavity is a planar surface of said polymeric matrix.

17. The structure of claim 1, wherein said polymeric matrix has a lower elastic modulus than said at least one bilayer platelet.

18. The structure of claim 1, wherein a concave surface of said bilayer platelet is in contact with said polymeric matrix.

19. A composite structure comprising a polymeric matrix and a bilayer platelet embedded therein, wherein said bilayer platelet comprises a pair of material layers joined to each other and having mismatched coefficients of thermal expansion (CTEs), wherein at least one cavity is present between said bilayer platelet and a surface of said polymeric matrix in a temperature range within which surfaces of said bilayer platelet have a non-zero curvature, wherein boundary surfaces of one of said at least one cavity consist of at least one surface of said polymeric matrix and at least one surface of said bilayer platelet, wherein said boundary surfaces of said one of said at least one cavity consists of a concave surface of said bilayer platelet and a concave surface of said polymeric matrix.

* * * * *